(12) United States Patent
Dammrose

(10) Patent No.: US 7,050,563 B2
(45) Date of Patent: May 23, 2006

(54) CALL PATH REDUCTION VIA CORRELATION OF CALL LEGS IN A HAIRPIN LOOP SCENARIO

(76) Inventor: J. Mark Dammrose, 14523 NE. 169th St., Woodinville, WA (US) 98072

(*) Notice: Subject to any disclaimer, the term of this patent is extended or adjusted under 35 U.S.C. 154(b) by 177 days.

(21) Appl. No.: 10/085,491

(22) Filed: Feb. 27, 2002

(65) Prior Publication Data
US 2003/0161460 A1   Aug. 28, 2003

(51) Int. Cl.
H04M 7/00   (2006.01)

(52) U.S. Cl. ............ 379/229; 379/211.02; 379/211.07; 455/433; 455/445

(58) Field of Classification Search ........... 379/144.01, 379/221.11, 221.13, 221.01, 207.02, 70, 221.07; 455/433, 445; 704/270.1
See application file for complete search history.

(56) References Cited

U.S. PATENT DOCUMENTS

| | | | | |
|---|---|---|---|---|
| 5,018,194 | A * | 5/1991 | Suzuki et al. | 379/211.02 |
| 5,550,911 | A * | 8/1996 | Bhagat et al. | 379/221.11 |
| 5,664,010 | A * | 9/1997 | Walker et al. | 379/221.07 |
| 5,790,638 | A * | 8/1998 | Bertacchi | 379/88.26 |
| 5,805,691 | A * | 9/1998 | Dendi | 379/221.01 |
| 5,881,145 | A * | 3/1999 | Giuhat et al. | 379/221.13 |
| 5,881,179 | A * | 3/1999 | Gillard | 382/261 |
| 5,884,179 | A | 3/1999 | Patel | |
| 5,995,610 | A * | 11/1999 | Smidt et al. | 379/207.02 |
| 6,052,589 | A * | 4/2000 | Persson et al. | 455/433 |
| 6,078,648 | A | 6/2000 | Albers et al. | |
| 6,097,797 | A | 8/2000 | Oseto | |
| 6,097,798 | A | 8/2000 | Albers et al. | |
| 6,144,723 | A | 11/2000 | Truchon et al. | |
| 6,370,241 | B1 * | 4/2002 | Clark | 379/144.01 |
| 6,381,306 | B1 | 4/2002 | Lawson et al. | |
| 6,393,289 | B1 * | 5/2002 | Bunting et al. | 455/445 |
| 6,549,613 | B1 | 4/2003 | Dikmen | |
| 6,601,031 | B1 * | 7/2003 | O'Brien | 704/270.1 |
| 6,845,152 | B1 * | 1/2005 | Taff et al. | 379/211.02 |
| 2003/0161446 | A1 | 8/2003 | Dammrose | |

OTHER PUBLICATIONS

Schwartz, "Wireless World: FBI phone tapping and locating cell phones making 911 calls: Is it privacy or paranoia?" *InfoWorld*, vol. 23, Issue 2, p. 52, Jan. 15, 2001.
Robinson, "Can't Take it with You," *Boardwatch Magazine*, vol. 15, Issue 3, p. 102, Mar. 2001.

(Continued)

*Primary Examiner*—Fan Tsang
*Assistant Examiner*—S. Elahee
(74) *Attorney, Agent, or Firm*—Klarquist Sparkman LLP

(57) ABSTRACT

A variety of methods and systems can be used to avoid a hairpin loop scenario. For example, in a system involving a redirecting switch and a service platform switch, correlation between calling party identities for outgoing and incoming call legs can be done to identify a potential hairpin loop scenario. Upon detection of such a scenario, appropriate call legs can be released while routing the call to its destination. Correlation information can be collected from available call setup signaling parameters. The methods and systems can be applied, for example, to systems involving directory assistance call completion, voice-activated dialing, voicemail callback, and prepaid services.

33 Claims, 14 Drawing Sheets

OTHER PUBLICATIONS

"Pacific Telesis Says Number Portability is 'Overrated'," *Communications Daily*, vol. 15, No. 178, pp. 1-2, Sep. 14, 1995.

"TR-45, J-STD-025, Rev. A, Lawfully Authorized Electronic Surveillance," Telecommunications Industry Association, pp. i-192, May 31, 2000.

"IPCablecom Electronic Surveillance Standard," Society of Cable Telecommunications Engineers, Engineering Committee, Data Standards Subcommittee, SCTE 24-13 2001, pp. ii-37, May 22, 2001.

* cited by examiner

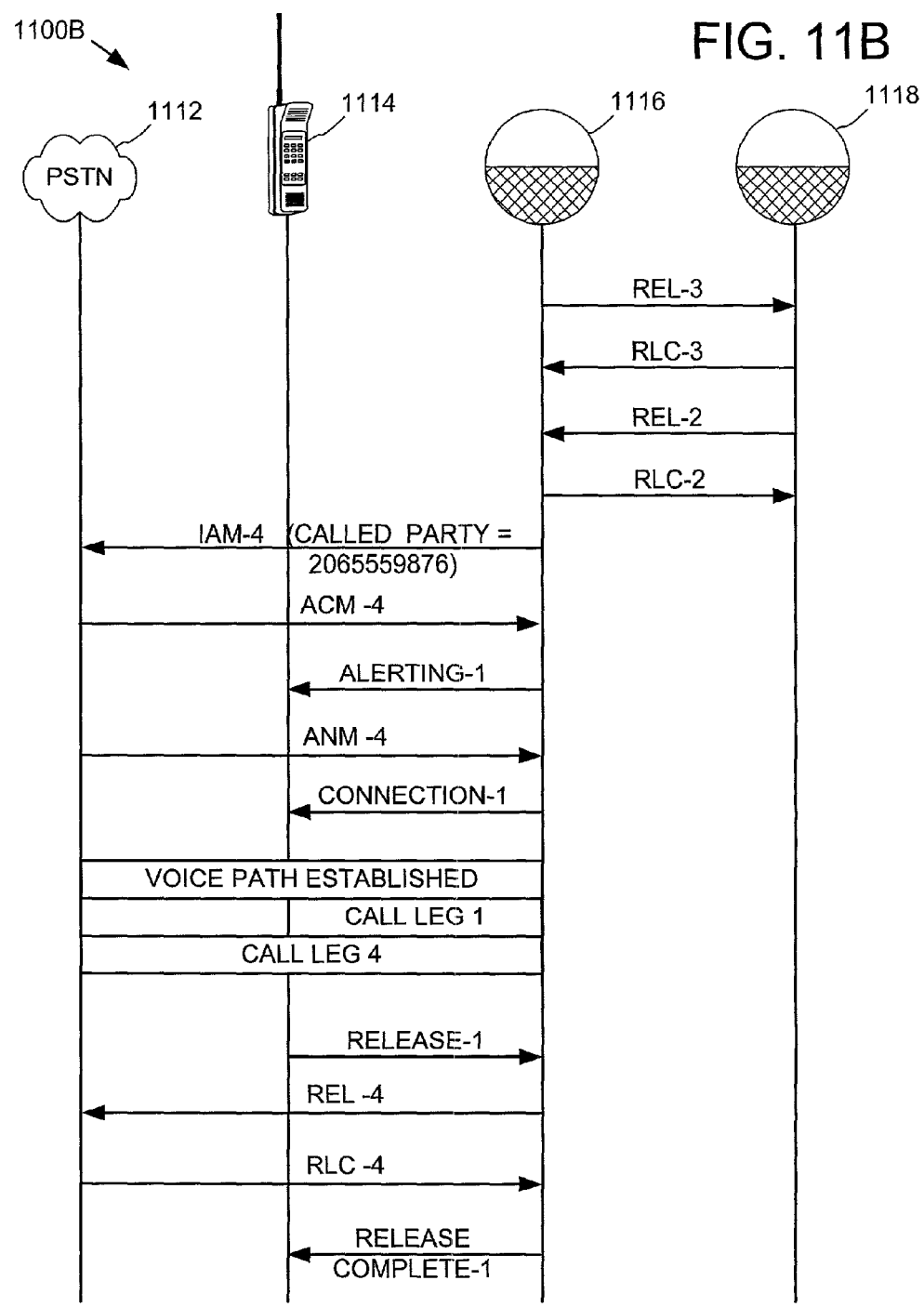

CALL PATH REDUCTION VIA CORRELATION OF CALL LEGS IN A HAIRPIN LOOP SCENARIO

TECHNICAL FIELD

The technical field relates generally to circuit switched networks. In particular, the field relates to reducing call path in a switched network such as a telecommunications network.

BACKGROUND

During call processing related to various telecommunications services, a switch may redirect a call. After redirection, a hairpin loop routing scenario can arise. For example, a first switch might redirect a call to a second switch for service processing. Upon completion of the service processing by the second switch, the call might then be routed back to the first switch for further processing, resulting in a hairpin loop.

SUMMARY

In cases where service processing by the second switch relates to call setup features (e.g., determining a destination phone number), additional interaction with the second switch is typically not required after the call is routed to its destination. Therefore, connection through the second switch for the duration of the call is often unnecessary. Reducing such unnecessary use of switch resources is desirable because the presence of the hairpin loop consumes switch capacity and transport requirements for both the first and second switch.

In disclosed embodiments, the hairpin loop scenario can be avoided. For example, a correlation key can be passed between a switch requesting service from a service platform switch and the service platform switch. Upon correlation of call legs, the call legs can be processed as a hairpin loop, and a hairpin loop can be avoided for the call path. For example, a. call leg can be removed. In this way, the call's path length can be reduced. Normal call processing can follow as the call is routed to its destination.

In certain embodiments, the value of the correlation key is an identity of the calling party. Alternatively, a billing identity can be used. Or, a dynamically assigned value can be used. For example, the dynamically assigned value can be temporarily inserted for use in calling line identity or billing fields. The correlation information can be collected from available call setup signaling parameters; therefore, the technologies can be used with switch systems not having specialized signaling protocols designed to avoid hairpin loops.

In illustrated embodiments, a switch can map an incoming call from a service platform switch to an existing outgoing call using trunk group characteristics (e.g., trunk type or trunk group membership) to determine the correlation key. If desired, only designated trunk groups need be checked. In this way, the number of trunks being checked during correlation can be reduced.

In some situations (e.g., call termination), a single party might be associated with multiple simultaneous calls. In such a case, an identity selected from a pool of dedicated identities can be substituted for the actual identity in a call setup signaling parameter. Correlation can then take place based on the selected identity.

The foregoing and other features and advantages will become more apparent from the following detailed description of disclosed embodiments, which proceeds with reference to the accompanying drawings.

BRIEF DESCRIPTION OF THE FIGURES

FIGS. 11A and 11B are signaling diagrams showing an exemplary implementation for avoiding a hairpin loop scenario in a directory assistance call completion situation.

DETAILED DESCRIPTION OF EXEMPLARY EMBODIMENTS

Overview

Figure 1:
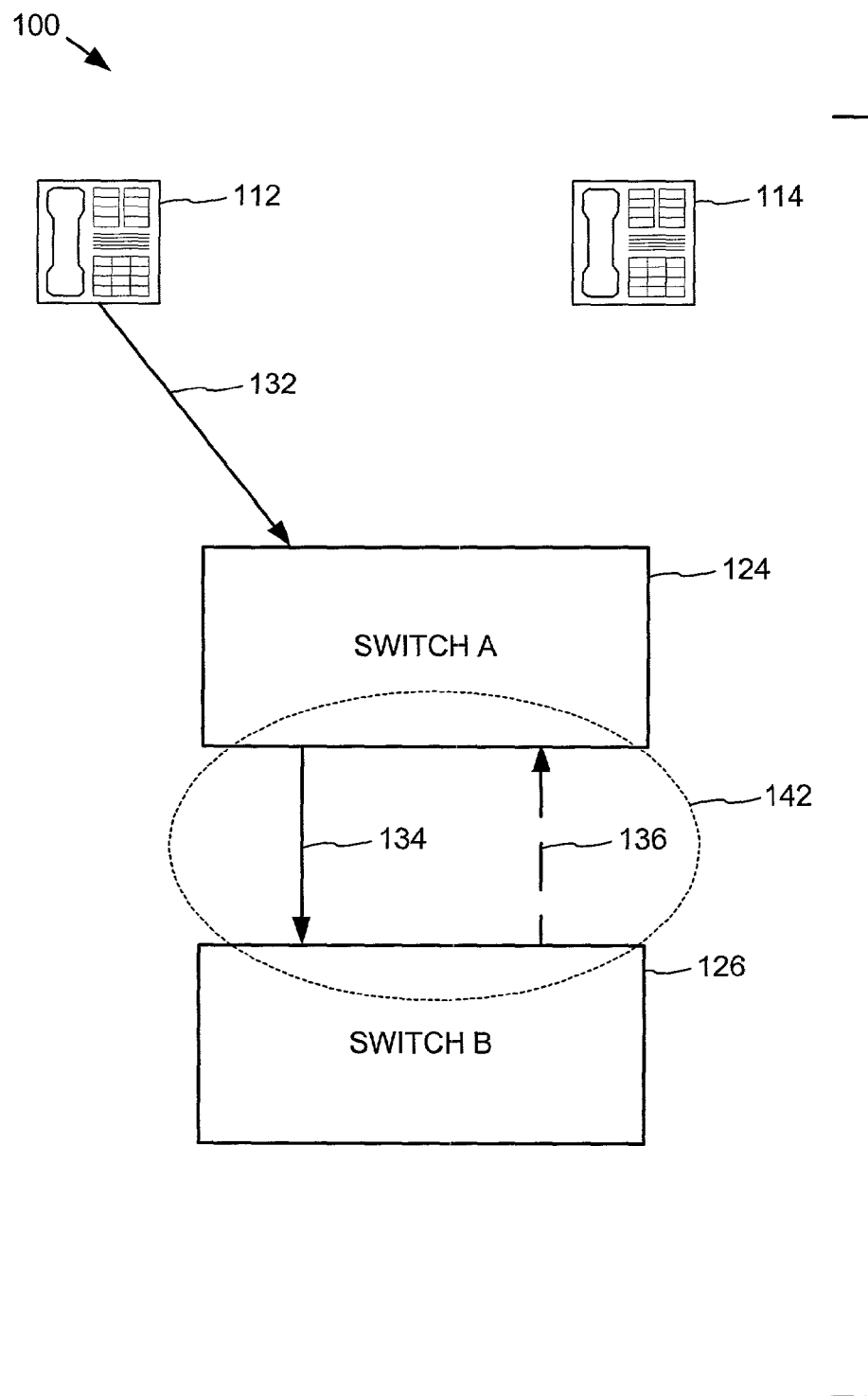
FIG. 1 is a block diagram showing a hairpin loop scenario in a telecommunications system having at least two switches.

An exemplary hairpin loop scenario is shown in FIG. 1. In the example, a telecommunications system 100 having at least two switches 124 and 126 is shown. A first telecommunications device (e.g., telephone) 112 establishes an incoming leg 132 to switch A 124 (e.g., as a result of a subscriber who initiates a telephone call).

In the example, the call is routed to switch B 126 (e.g., because switch A 124 is unable to handle a requested service such as directory assistance with call completion, network-based voice-activated dialing, voicemail callback, or prepaid calling services). The call leg 134 is thus established. As a result of the service provided by the switch B 126 (e.g., determining that the call is to be routed to another destination, such as the device 114), a destination is determined. Then, the call is routed back to switch A 124. Another call leg 136 is thus established or attempted. Because the call returns to a switch that redirected it, the call leg scenario 142 is sometimes called a "hairpin loop."

In disclosed embodiments, correlation between the call legs in the hairpin loop scenario 142 can be accomplished. Based on the correlation, the hairpin loop scenario 142 is avoided. Avoiding the hairpin loop scenario can include preventing formation of a hairpin loop scenario. Alternatively, avoiding the hairpin loop scenario can include removing the hairpin loop scenario after it has been formed. In some cases, avoiding the hairpin loop scenario includes removing an incompletely formed (e.g., formed for a call leg but not formed for a voice path) hairpin loop.

EXAMPLE 1

Exemplary Method for Avoiding a Hairpin Loop Scenario

Figure 2:
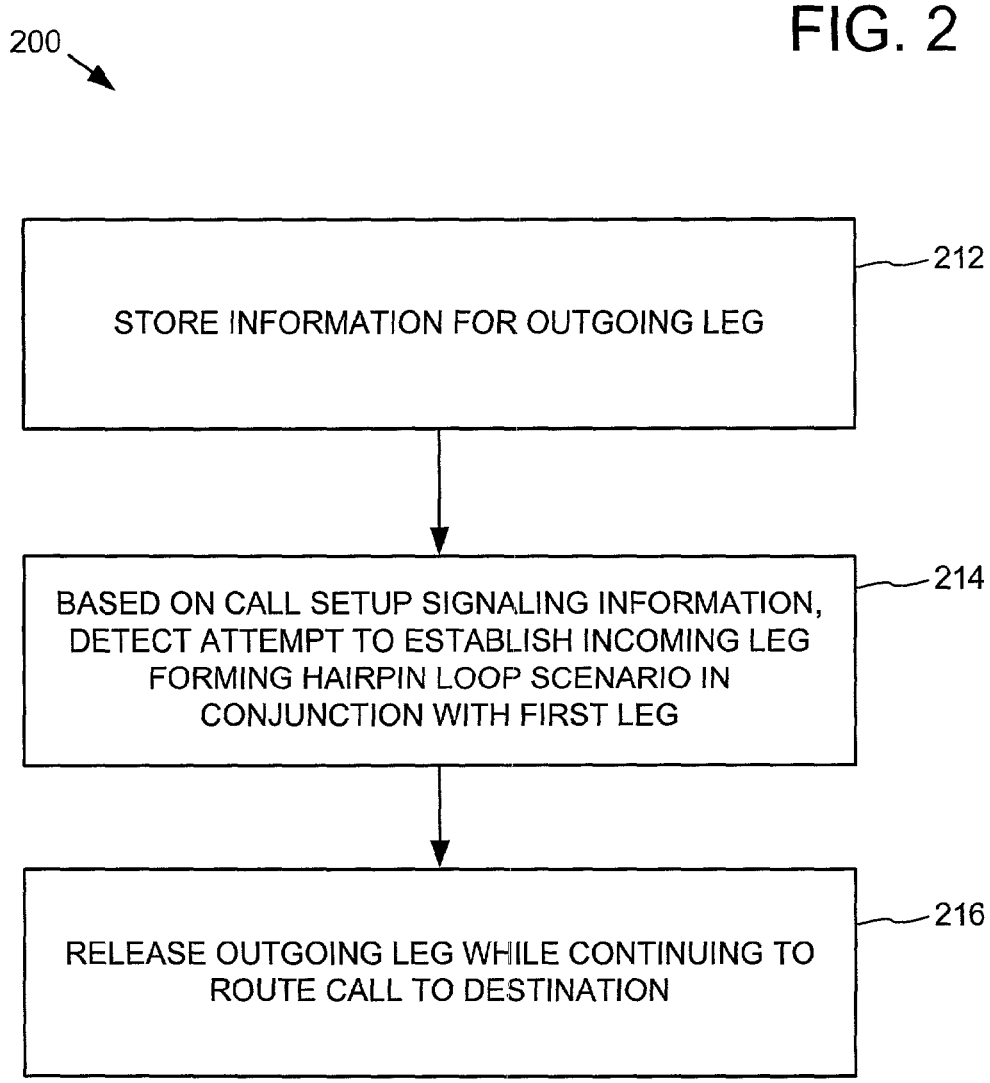
FIG. 2 is a flow chart showing an exemplary method for avoiding a hairpin loop scenario.

An exemplary method 200 for avoiding a hairpin loop scenario is shown in FIG. 2. Such a method can be implemented, for example, in a telecommunications architecture involving at least two switches.

At 212 information is stored for art outgoing call leg. The stored information is sometimes called "correlation information" because it can later be used to correlate the call leg with an incoming leg to detect a potential hairpin loop scenario. The information can take a variety of forms, such as party identification (e.g., phone number), billing number, or other identifier (e.g., dynamically assigned when the call leg is formed). The outgoing call leg can be, for example, a call leg routed from a redirecting switch to a service platform switch.

At 214, based on call setup signaling information for an incoming leg and the stored correlation information, an attempt to establish an incoming leg forming a hairpin loop scenario in conjunction with the outgoing leg is detected and correlated. For example, call setup signaling information might indicate a party identification, billing number, or other information. Further, the call setup signaling can indicate a destination (e.g., a destination determined as a result of service processing).

Correlation can be achieved, for example, by detecting a match between information stored at 212 and the call setup signaling information related to the incoming leg.

At 216, as a result of correlating the call legs and detecting the potential hairpin loop scenario, at least one hairpin loop call leg (e.g., the outgoing leg, the incoming leg, or both) is released while the call is routed to its destination. Although the example only mentions two legs, other legs can be involved in the call (e.g., an incoming leg from a subscriber to the redirecting switch, which redirects the call to a second switch for servicing), some or all of which may or may not be released. Release of the outgoing hairpin loop call leg can be accomplished in an indirect fashion (e.g., by releasing the incoming leg, which triggers release of the outgoing leg).

EXAMPLE 2

Exemplary Data Flow for Avoiding a Hairpin Loop Scenario

Figure 3:
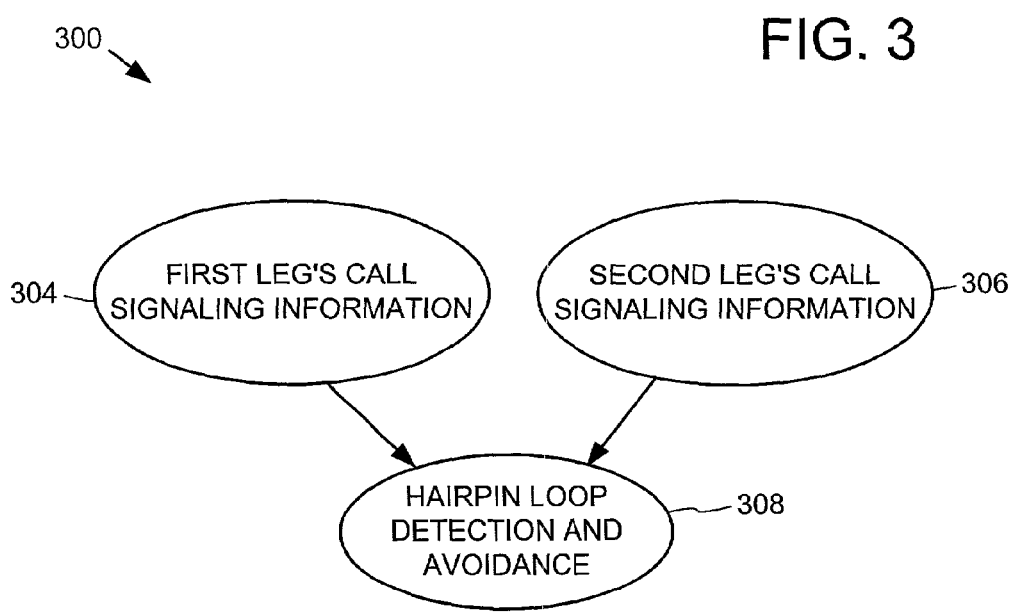
FIG. 3 is a data flow diagram showing exemplary inputs for hairpin loop detection and avoidance.
Figure 4:
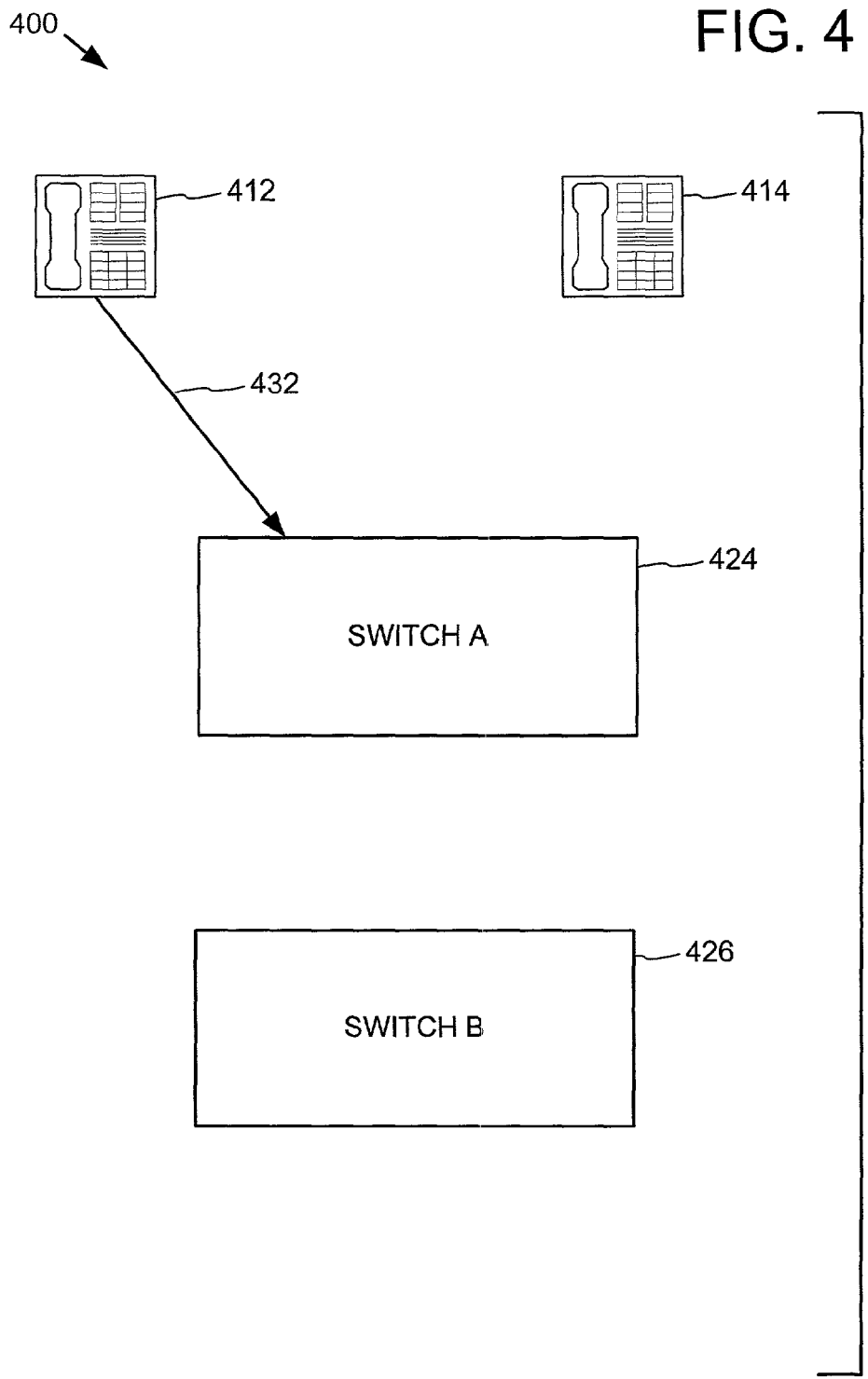
FIGS. 4, 5, 6, and 7 are block diagrams showing an exemplary telecommunications network in which a hairpin loop scenario is detected and avoided.

An exemplary data flow 300 for avoiding a hairpin loop scenario is shown in FIG. 3. Call signaling information for a first leg 304 and call signaling information for a second leg 306 are used for hairpin loop detection and avoidance 308. Call signaling information can be any of a variety of information, including call set up signaling information, such as a calling party's identity (e.g., telephone number), billing identifier, or another identifier, such as a dynamically generated identifier. For example, a dynamically generated identifier can be temporarily placed in calling party identity or billing fields. Identifiers can be stored in a list to be consulted for later processing (e.g., correlation).

In some cases, additional data can be used for the hairpin loop detection and avoidance 308, such as trunk type for incoming call legs, the destination of a call, and other information. In the case of trunk type, a trunk can be designated to be of a type (e.g., incoming hairpin loop type or outgoing hairpin loop type) to be monitored for hairpin loop scenarios. In such an arrangement, call legs can additionally be checked to determine if they are on a trunk being of a type to be monitored. In this way, checking for hairpin loop scenarios need not take place for trunks not of the designated type.

For example, call signaling information for outgoing call legs can be stored based on whether the call leg is going out on a trunk of type "outgoing hairpin loop," and call signaling information for incoming call legs can be correlated based on whether the call leg is coming in on a trunk of type "incoming hairpin loop." Further, or alternatively, when correlating an identifier for an incoming call, only identifiers associated with trunk type "outgoing hairpin loop" need be checked for correlation. Trunks of type "incoming hairpin loop" need not be checked; thus, the number of trunks to be checked can be reduced.

EXAMPLE 3

Exemplary Avoidance of a Hairpin Loop Scenario

FIGS. 4–7 are block diagrams showing an exemplary telecommunications system 400 in which a hairpin loop scenario is avoided. In the telecommunications system 400 of FIG. 4, a telecommunications device 412 is employed by a customer to make a call requiring a service not to be processed by switch A 424, which receives the call via the incoming call leg 432. The telecommunications device 412 can be a wireless telephone or a landline telephone.

Figure 5:
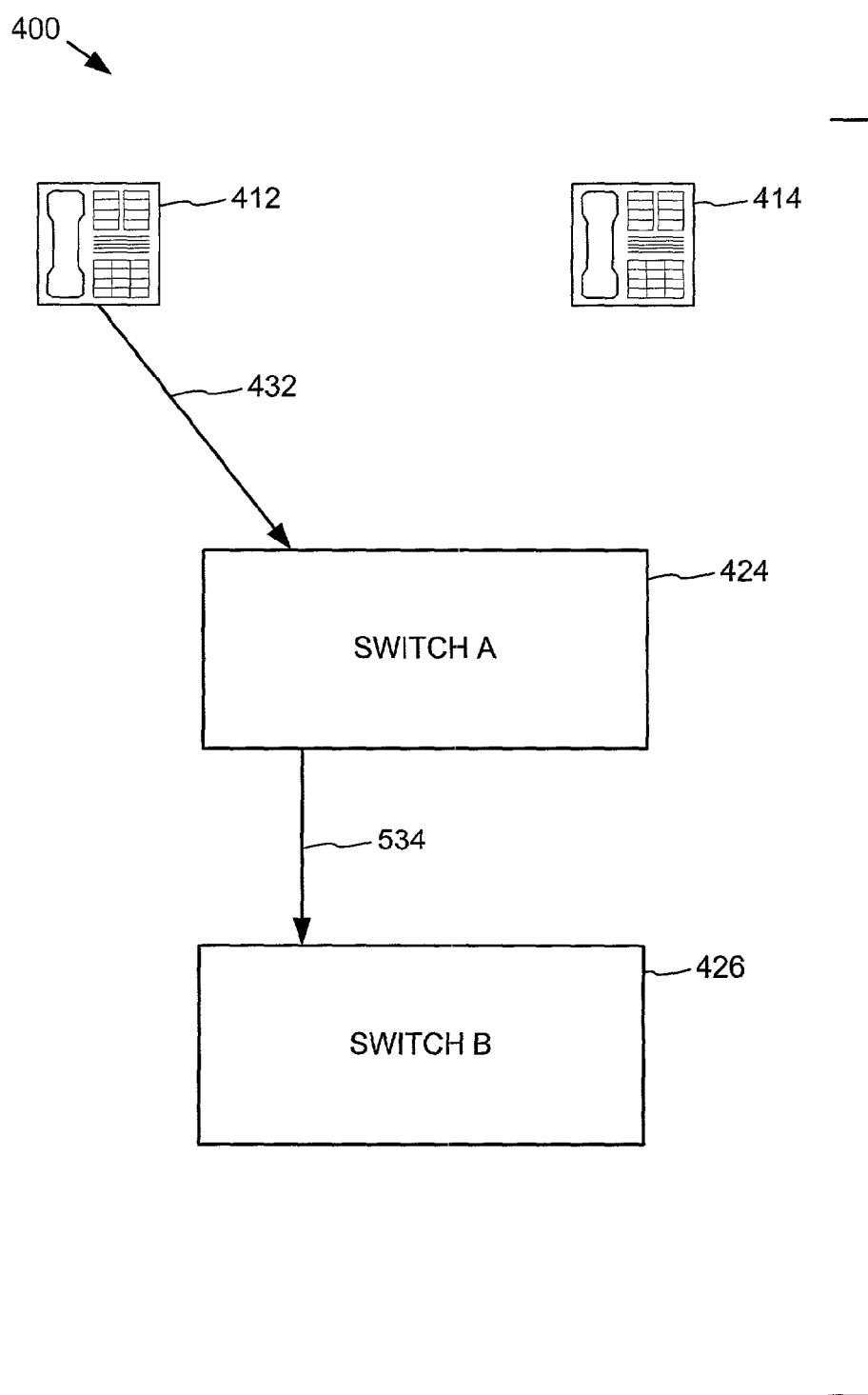

As shown in FIG. 5, switch A 424 routes the call to switch B 426 to facilitate performance of the service, forming the call leg 534. The call leg 534 can be described as the first leg in a potential two-leg hairpin loop scenario. Because switch A 424 redirects the call, it is sometimes called a "redirecting switch." Because switch B 426 performs call servicing, it is sometimes called a "service platform switch." Switch B 426 can be any of a variety of switches in a variety of locations (e.g., a single DS1 adjunct platform collated with switch A 424 or a Service Switching Point for a large network service center at a distant location).

Figure 6:
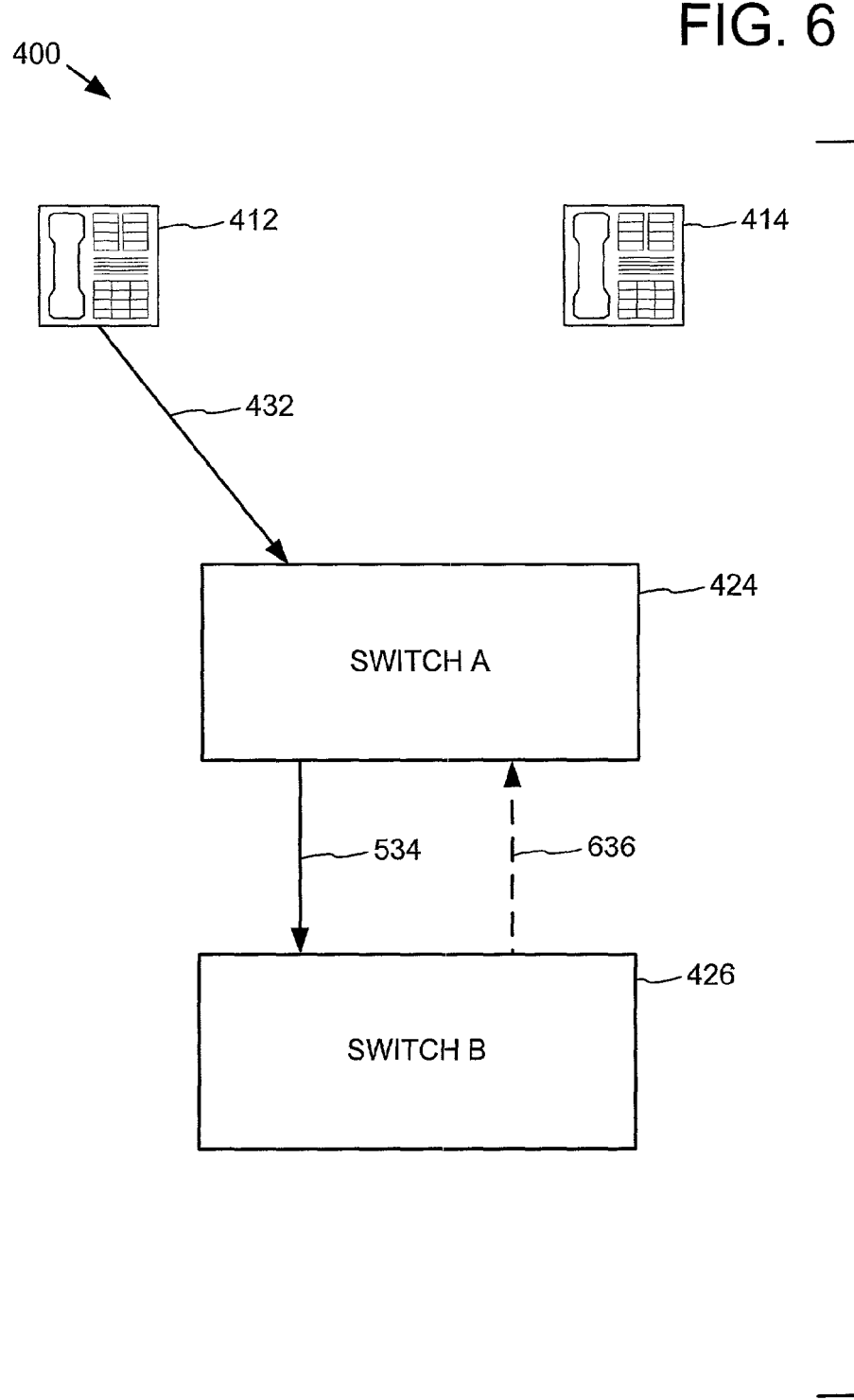

Then, as shown in FIG. 6, after performing service processing and possibly determining a new destination, switch B 426 routes the call back to switch A 424, requesting that the call leg 636 be formed, which would result in a hairpin loop scenario (i.e., for the call legs 534 and 636).

Figure 7:
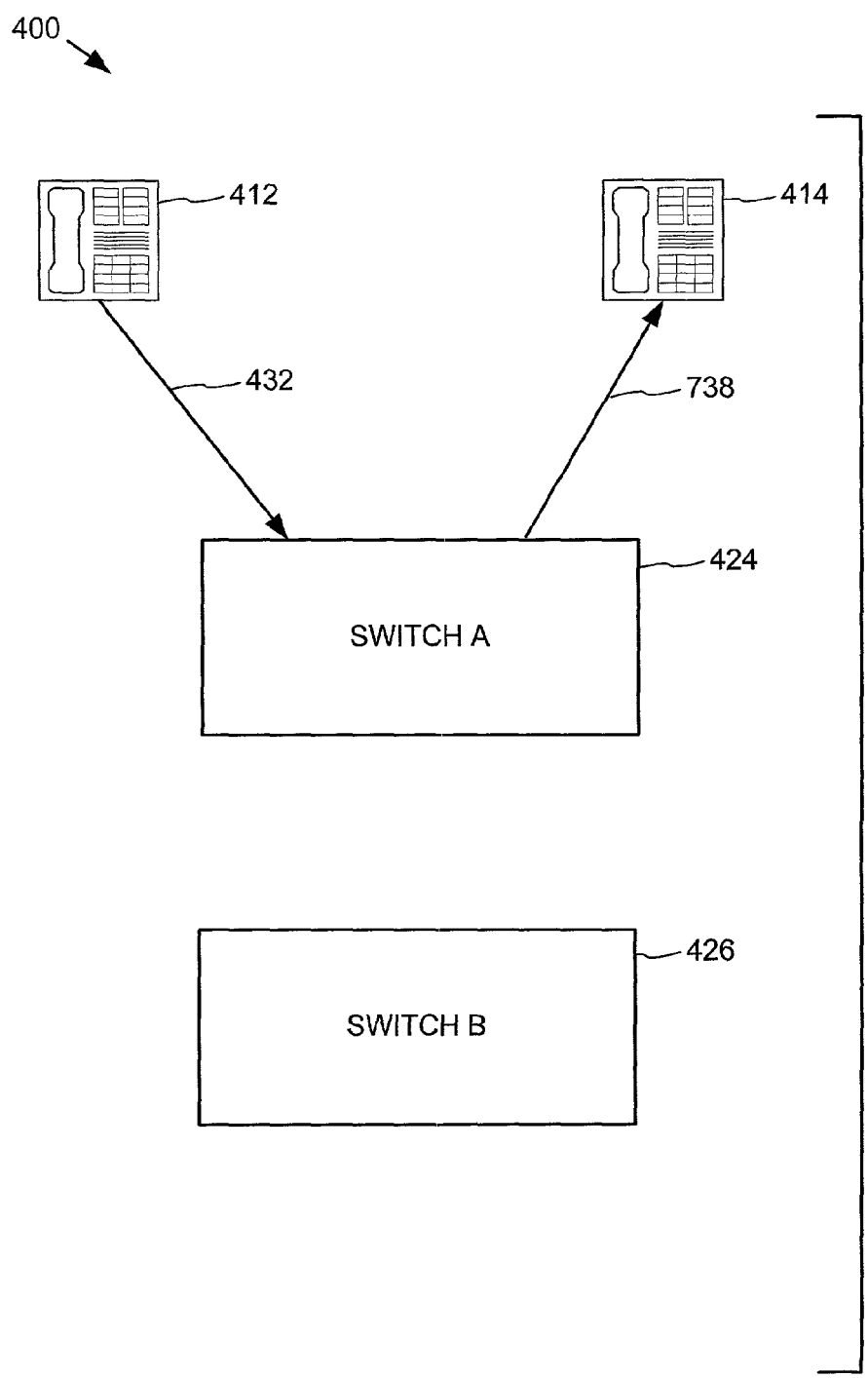

However, the call legs 534 and 636 can be correlated via correlation information. Based on the correlation indicating detection of the potential hairpin loop scenario, the hairpin loop scenario can be avoided as shown in FIG. 7 by removing the call legs 534 and 636.

The call can then be routed to the destination device 414 (e.g., via the call leg 738). The identity of the destination device 414 can be determined by examination of a parameter (e.g., a "called party" parameter) contained in the request to form the call leg 636.

EXAMPLE 4

Exemplary Avoidance of a Hairpin Loop Scenario Showing Ports

Figure 8:
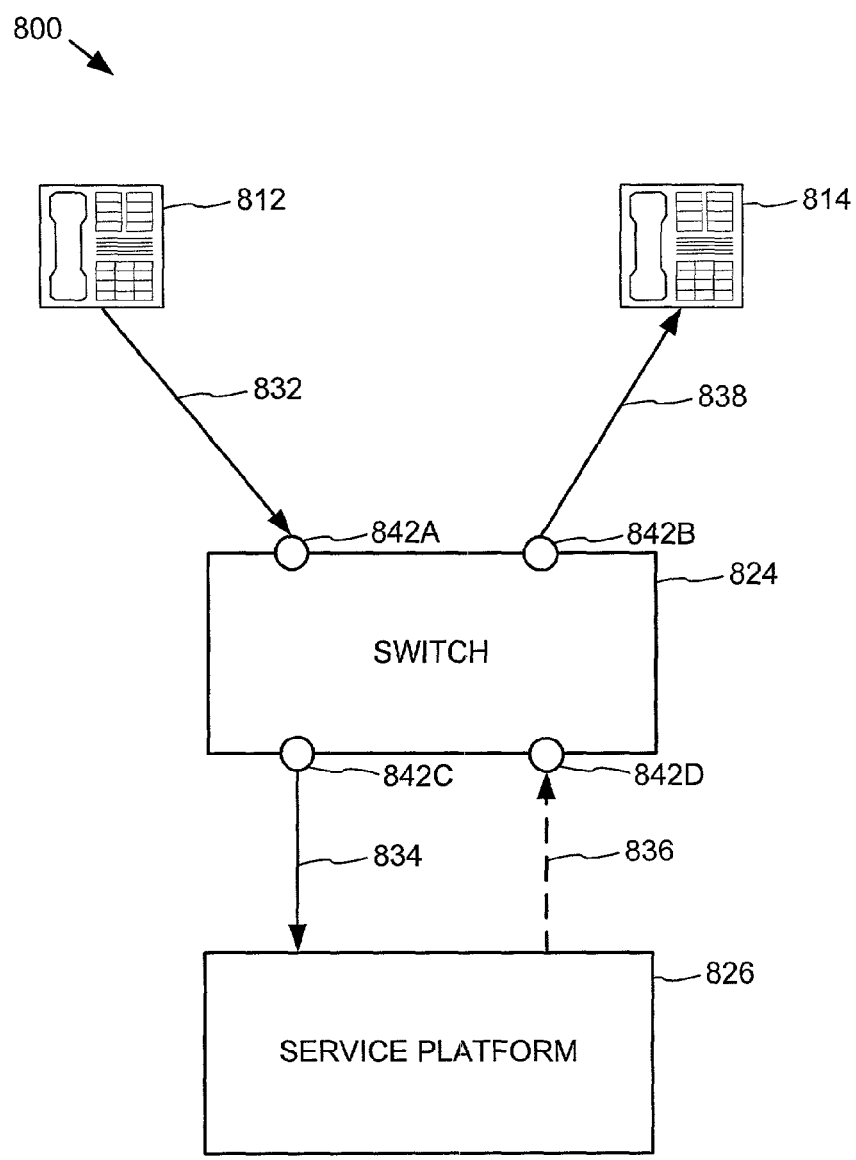
FIG. 8 is a block diagram showing an exemplary telecommunications network in which ports are depicted.

FIG. 8 shows an exemplary telecommunications system 800, including an illustration of various ports. Although input and output ports are shown in the example, bi-directional ports can be used. In the example, a telecommunications device originates a call (e.g., a customer initiates a telephone call), which is directed to the port 842A of the switch 824, resulting in an incoming call leg 832. As a result of determining that the call is to be directed to a service platform for processing, the call is directed from port 842C to the service platform 826, resulting in an outgoing call leg 834.

After performing service processing, the service platform can route the call back to the port 842D of the switch 824, resulting in an attempted incoming call leg 836, which would form a hairpin loop scenario. Upon detection of the potential hairpin loop scenario, the various ports can be handled appropriately.

For example, correlation information can be stored that can be compared for ports 842C and 842D to determine that the same call (e.g., the same calling party, same billing identifier, or other identifying information) is involved. Upon detecting a match between the correlation information, the port on which the call arrived 842A can be parked while the other ports 842C and 842D are released. During parking, silence can be applied to the voice path. The call can then be routed out the port 842B to its destination 814, forming the call leg 838.

EXAMPLE 5

Exemplary Method of Avoiding a Hairpin Loop Scenario Via Ports

Figure 9:
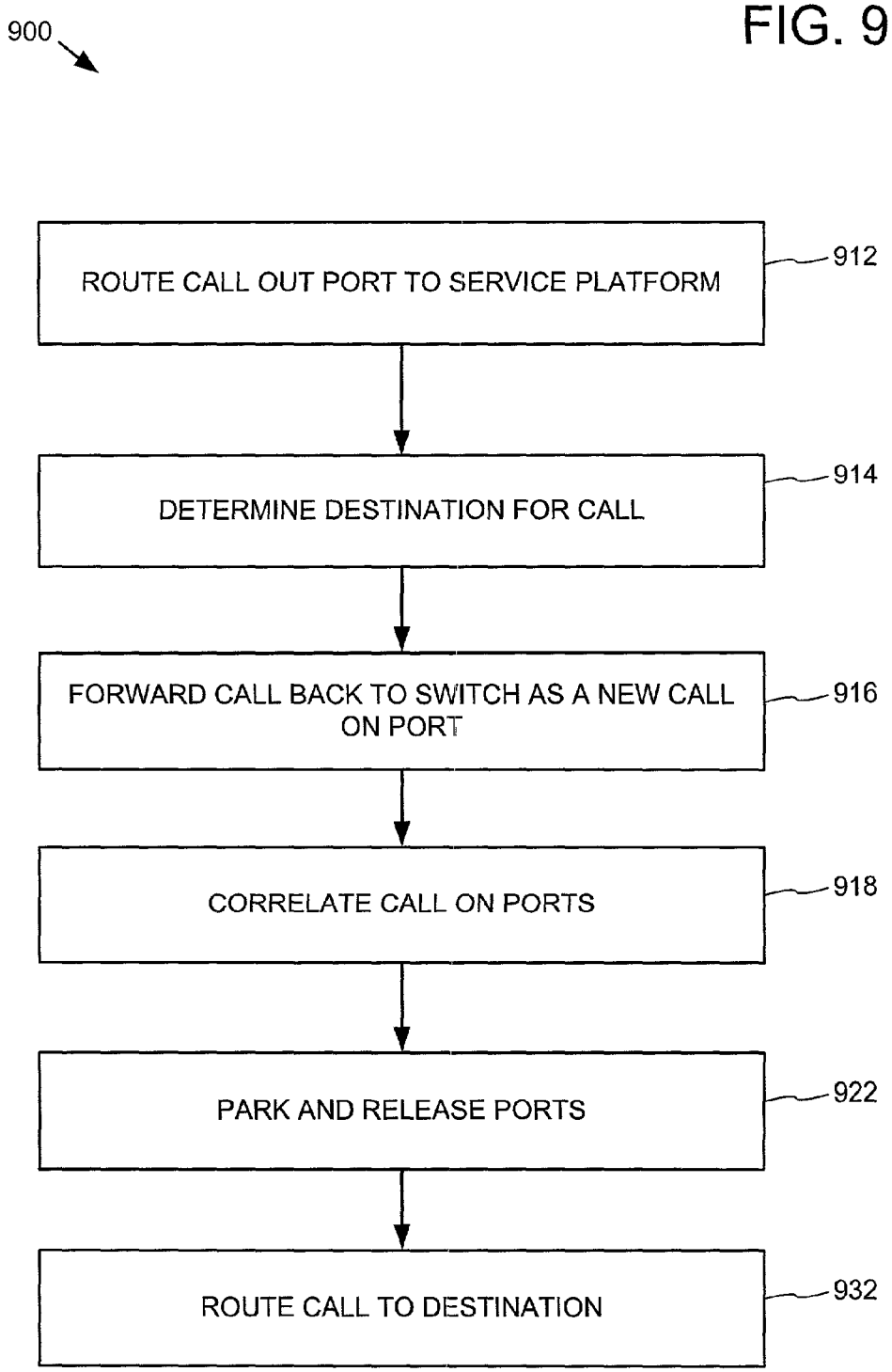
FIG. 9 is flow chart showing an exemplary method for avoiding a hairpin loop scenario.

An exemplary method 900 for processing a call while avoiding a hairpin loop scenario is shown in FIG. 9. The method can be used, for example, in a telecommunications network comprising at least a redirecting switch and a service platform switch.

At 912, a call is routed out a port from the redirecting switch to the service platform switch. At such time, it can be determined whether hairpin loop scenario detection is to be performed (e.g., by checking whether the outgoing trunk associated with the call is designated as being of a type for which hairpin loop detection is to be performed). If so, correlation information can be collected from call setup signaling information. For example, information indicating the calling party's identity, billing identifier, or other information can be stored. Also, the port out of which the call is being routed (e.g., from the redirecting switch) can be stored. Further, an indication of the port on which the call arrived (e.g., at the first switch) can be stored. Alternatively, such information can be determined later (e.g., as described below).

At 914, a destination for the call is determined. For example, if the service platform switch is related to directory assistance call completion, a calling customer typically requests a search for the number of a called party. Or, in the case of network-based voice-activated dialing, the spoken word "home" can be translated into a home telephone number. The call can then be directed to the destination number.

At 916, as the call is forwarded back to the redirecting switch, appearing to be a new call on another port, the trunk type can be checked to see if the call is to be checked for hairpin loop avoidance. If so, call set up signaling information can be collected (e.g, party identity, billing identifier, or other information) and checked against correlation information stored earlier for the call at 918. If there is a match, a potential hairpin loop scenario is indicated. For example, if the party identity for an outgoing call routed from the redirecting switch to the service platform switch matches the party identity for an incoming call arriving at the redirecting switch, the calls are actually the same call forming a hairpin loop scenario.

Responsive to correlating the call on the ports, the appropriate ports can be parked and released at 922. For example, the port at which the call originally arrived (e.g., at the first switch) can be parked and silence applied to the call. A release signal can be sent to the service platform switch for the incoming leg, which in turn will lead to a release of the outgoing call leg from the first switch to the service platform switch. The call can then be routed to its determined destination at 932.

EXAMPLE 6

Figure 10:
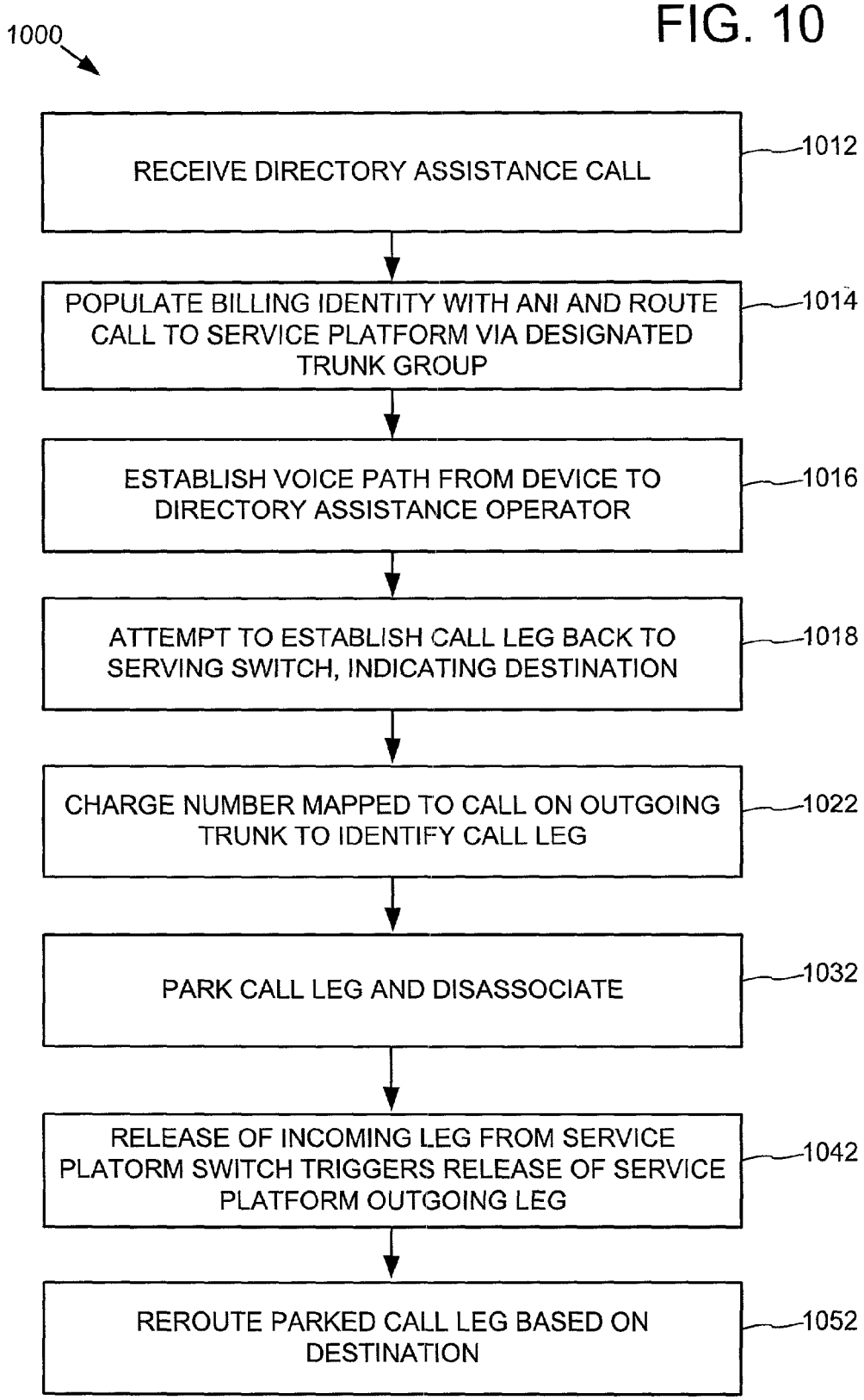
FIG. 10 is a flow chart showing an exemplary method for avoiding a hairpin loop scenario in a directory assistance call completion situation.

Exemplary Methods and Systems for Avoiding a Hairpin Loop Scenario in a Directory Assistance Call Completion Situation FIGS. 10 and 11 show exemplary methods and systems for avoiding a hairpin loop scenario in a directory assistance call completion situation. In the example, a telecommunications network 1100A and 1100B comprises access to a public switched telephone network 1112, a mobile telecommunications device 1114, a redirecting switch 1116, and a service platform switch 1118 for processing directory assistance call completion. The service platform switch 1118 can provide other or additional services (e.g., voice-activated dialing, voicemail callback, or prepaid services), and the illustrated methods work in a similar manner. Hairpin loop detection and avoidance can be performed transparently to the service platform switch 1118. For example, the service platform switch 1118 need not include functionality related to hairpin loop detection and avoidance.

Figure 11A:
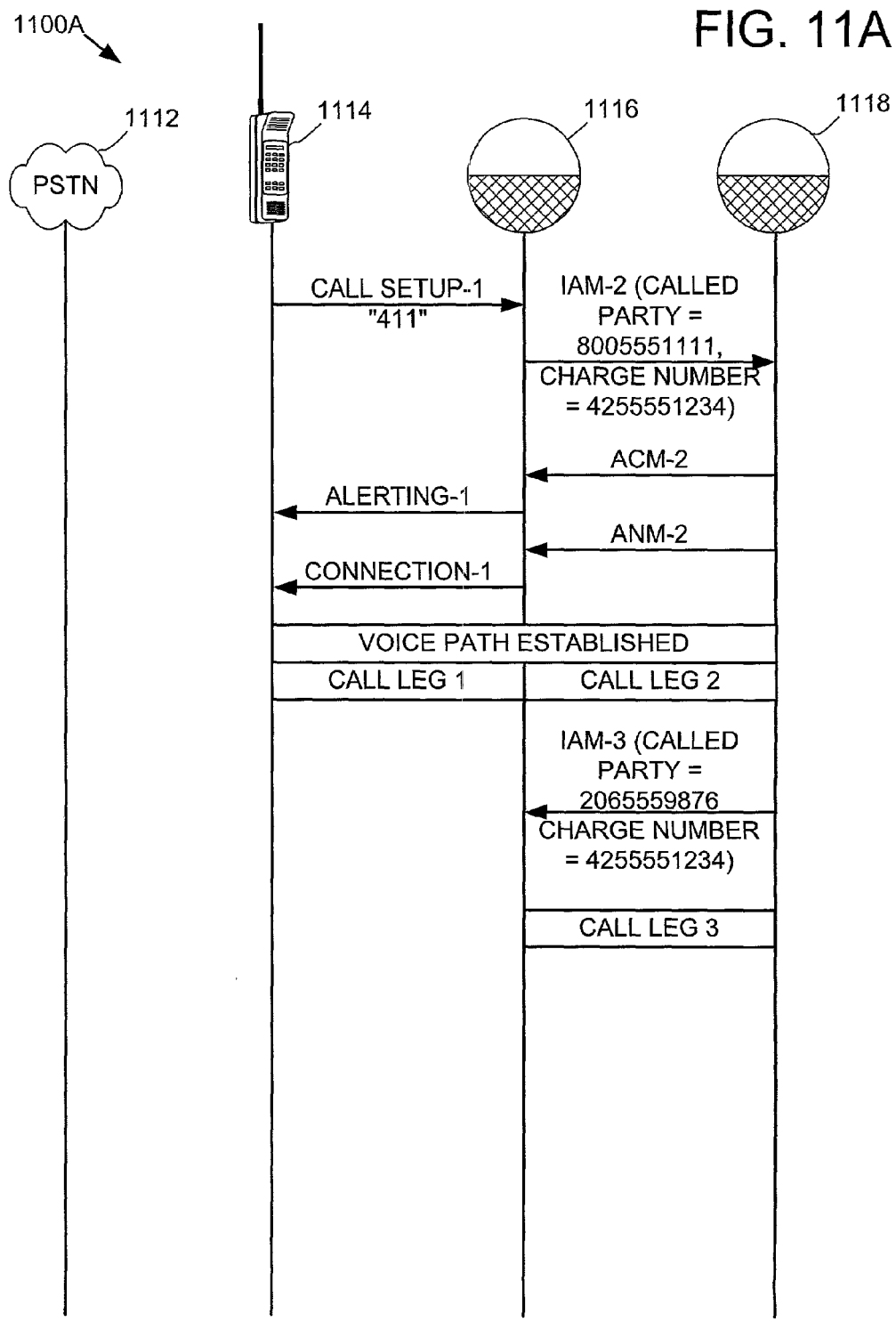

In the example, ISUP signaling (e.g., for an SS7 network) is shown, but other signaling interfaces (ISDN-PRI, ISDN-BRI, R1 Feature Group-D, or GSM-based implementations) or protocols can be used. Although FIGS. 11A and 11B depict a Charge Number parameter, any number of other parameters (e.g., a calling party number or call reference parameter) can be used in its place for correlation.

A method 1000 for processing a call is shown in FIG. 10. At 1012, a directory assistance call is received (e.g., at the redirecting switch 1116 from a subscriber using the device 1114). For example, a subscriber at the telephone number "425-555-1234" might dial "411," resulting in call setup information being sent to the redirecting switch.

At 1014, call processing determines that the call is to be routed over an outgoing hairpin trunk group (e.g., type "outgoing hairpin loop trunk"), so the billing identity parameter is populated with Automatic Number Identification ("ANI") information (e.g., from the incoming call above) and the call is routed to a service platform switch (e.g., the switch 1118). For example, an Initial Address Message ("IAM") signal can be sent to the service platform switch (e.g., the switch 1118), including billing information (e.g., the subscriber's phone number) as part of the call set-up protocol.

At 1016, a voice path is established from the communications device (e.g., the device 1114) to the directory assistance operator. As illustrated, the voice path involves two call legs. The subscriber requests that the directory assistance operator complete the call to the destination (e.g., a phone number). After the destination of the call is determined, the service platform switch then routes the call back and attempts to establish an incoming call leg to the redirecting switch 1116 via call setup signaling, indicating the ultimate destination of the call at 1018. In the example, the attempt is shown as the "IAM-3" signal.

At 1022, billing information (e.g., a billing number or charge number) is extracted from the call setup signaling. The billing information from the incoming call (e.g., call leg 3) is then mapped to a call on the outgoing trunk to identify the associated outgoing call leg (e.g., call leg 2 in the example). Having found the outgoing call leg, the system can then also identify the associated incoming call leg from the device (e.g., call leg 1 in the example). Information about the destination (e.g., the telephone number of the called party) can also be extracted and saved for later use.

At 1032, the appropriate incoming call leg from the device is parked (e.g., call leg 1 in the example), and the leg is disassociated (e.g., from call leg 2). Silence can be applied while the call is parked.

At 1042, the incoming call leg from the service platform switch (e.g., call leg 3) is released. Release of the incoming call leg from the service platform switch triggers release of the outgoing leg to the service platform switch (e.g., call leg 2).

At 1052, the parked call is rerouted based on the destination number (e.g., determined from the "called number" parameter of call leg 3), establishing a call leg from the redirecting switch directed to the destination (e.g., in the example, the call is directed to the phone number "2065559876" via the public switched telephone network 1112).

EXAMPLE 7

Exemplary Signaling for Avoiding a Hairpin Loop Scenario in a Directory Assistance, Call Completion Situation FIGS. 11A and 11B show an exemplary signaling arrangement for avoiding a hairpin loop scenario in a directory assistance call completion situation. In the example, call setup information (e.g., "411") is sent from a telephone 1114 to a redirecting switch 1116. Then, an IAM (e.g., including a called party parameter of "800555111" and a charge number parameter of "4255551234") is sent to the service platform switch 1118 (shown as "IAM-2"). After various other signaling, a voice path is established by which the caller can ask for directory assistance (shown with reference to call legs 1 and 2).

As a result of determining the call's destination, another IAM (e.g., including a called party parameter of "2065559876" and a charge number of "4255551234") is sent from the service platform switch 1118 to the redirecting switch 1116 (shown as "IAM-3"). As a result, construction of call leg 3 is attempted.

Having correlated the parameters from the IAM-2 and IAM-3, hairpin loop processing takes place. In the example, various release signaling shown as REL-3, RLC-3, REL-2, and RLC-2 takes place. Also, call leg 1 can be parked and silence applied to the call during release. Parking the call leg can prevent it from being released.

An IAM (e.g., including a called party parameter of "2065559876") is then sent to the network 1112 (shown as "IAM-4"). After appropriate additional signaling, a voice path is established (shown with reference to call legs 1 and 4). After completion of the call, other release signaling can take place (e.g., including RELEASE-1, REL-4, RLC-4, and RELEASE COMPLETE-1 as shown in the example).

EXAMPLE 8

Exemplary Switch System for Avoiding a Hairpin Loop Scenario

Figure 12:
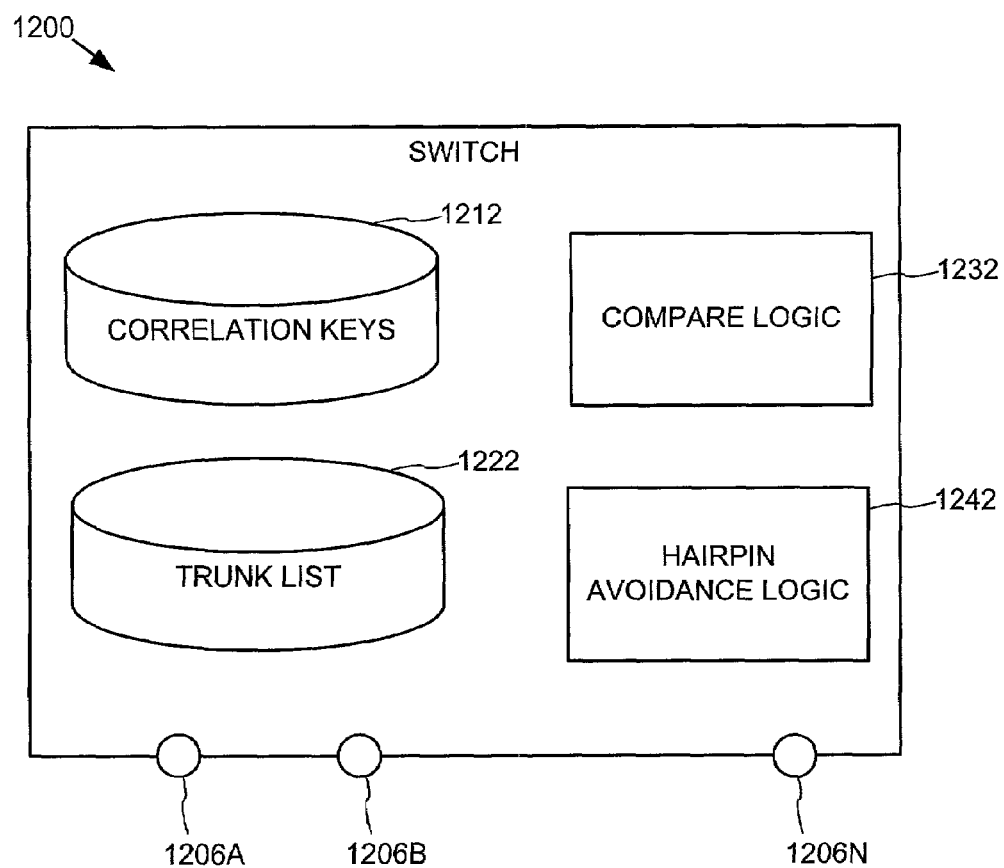
FIG. 12 is a block diagram showing an exemplary switch system for avoiding a hairpin loop scenario.

FIG. 12 shows an exemplary switch system 1200. The system can be used to avoid hairpin loop scenarios. For example, the switch system 1200 can be used as an implementation of a redirecting switch (e.g., switch 424, switch 824, or switch 1116). The switch system 1200 can be implemented, for example, as a Mobile Switching Center or a Class 5 Switch. Various ports 1206A, 1206B, and 1206N are shown. More ports can be implemented as desired.

The switch system 1200 can be implemented in any of a variety of switch hardware by adding a software upgrade or modification by which the switch system 1200 can identify and avoid a hairpin loop scenario. Although information can also be stored for other call legs, in the example, correlation keys store 1212 stores the correlation keys for call legs directed from the switch 1200 to a service platform switch. In the example, correlation keys are stored only for those calls going out on trunks listed in the trunk list store 1222.

The trunk list store 1222 can be implemented in a variety of ways. For example, a trunk can be given a particular type (e.g., type "outgoing hairpin loop"). Trunks having the type are then considered to be in the list. Or, trunk identifiers can be stored in a list as a trunk group.

In some systems, the correlation keys store 1212 and the trunk list store 1222 information is already available and separate stores are not required. For example, the switch system 1200 might support a software request to locate a call instance on an outgoing hairpin loop trunk group matching a supplied parameter (e.g., billing information for a call coming in on an incoming hairpin loop trunk group).

The compare logic 1232 is operable to compare information (e.g., billing party identifier, or other information) with that stored in the correlation keys store 1212. Although comparison could be done for more call legs, in the example, comparisons are done only for call legs coming in on trunks listed in the trunk list 1222. The trunk list store 1222 can designate such trunks in a variety of ways. For example, a trunk can be given a particular type (e.g., type "incoming hairpin loop"). Trunks having the type are then considered to be in the list. Or, trunk identifiers can be stored in a list of trunks (e.g., in the same list as the outgoing hairpin loop trunks or in a separate list).

If the compare logic 1232 finds a correlation (e.g., match) between an outgoing call leg and an incoming call leg, a potential hairpin loop scenario is indicated. Responsive to detecting a correlation by the compare logic 1232, the hairpin avoidance logic 1242 is activated. The hairpin avoidance logic 1242 is operable to avoid the hairpin loop scenario. For example, the logic 1242 can park a call leg (e.g., an incoming call leg from a subscriber) and then release other legs, while directing the call to its destination. Silence can be applied to the call during release.

In the example, the redirecting switch can be configured to have at least two special unidirectional trunk groups: an outgoing trunk group (e.g., used for calls routed from the redirecting switch to the service platform switch) and an incoming trunk group (e.g., used for calls returning from the service platform switch to the redirecting switch). Alternatively, bi-directional trunks can be used.

Trunk configuration for any of the examples can be done to ensure calls are handled properly and to avoid unnecessary processing (e.g., checking for hairpin loops scenarios in situations where such scenarios are not likely or impossible to occur).

EXAMPLE 9

Exemplary Implementations Using Various Communications Protocols

To implement the illustrated examples, the interface between a redirecting switch and the service platform switch can use call setup signaling capable of transmitting any of a variety of information useable as correlation information (e.g., calling party identity, billing number, or both). For example, ANI can be used. Examples of signaling interfaces that can be used include ANSI-ISUP signaling (e.g., the Calling Party Number, Charge Number, or some combination of the parameters are supported in the IAM), ISDN-PRI signaling (e.g., the Calling Party Number is supported in the Setup Message), ISDN-BRI signaling, R1 Feature Group-D Signaling (e.g., ANI delivery is supported). Other signaling interfaces, including ITU-ISUP (e.g., calling party number is supported) can be used. Further, the call reference parameter for ISDN/ISUP signaling can be used for correlation.

Use of other signaling parameters specific to a signaling interface (e.g., the "call reference" parameter in ISDN/ISUP signaling) is possible. In some cases, it may be desirable to combine two or more parameters for correlation.

For any of the illustrated examples, the service platform switch can return the correlation information unmodified in the same signaling parameter as received from the redirecting switch, but other arrangements are possible.

EXAMPLE 10

Figure 13:
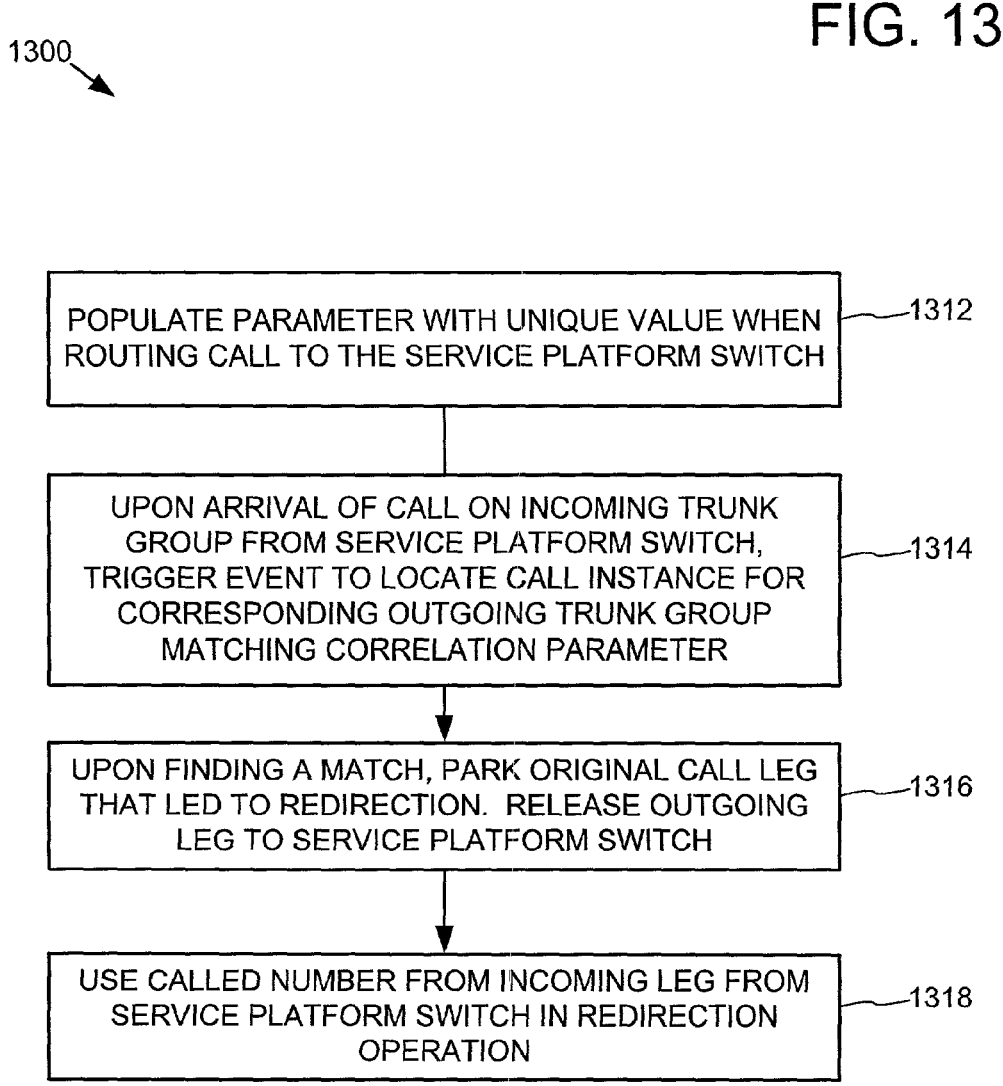
FIG. 13 is a flow chart showing an exemplary method for avoiding a hairpin loop scenario, including simultaneous multi-call per subscriber support.

Exemplary Method for Avoiding a Hairpin Loop Scenario and Optional Simultaneous Multi-Call Support FIG. 13 shows a method 1300 for avoiding a hairpin loop scenario, including optional support for a situation in which a caller can have more than one call active at a time. The method can be used with any of the depicted telecommunications systems.

At 1312, when a call is routed from a redirecting switch to a service platform switch, a parameter (e.g., billing identity or calling party identity) is populated with a unique value. For example, the unique value can be a subscriber's calling identity (e.g., Directory Number (DN), Mobile Directory Number (MDN), Mobile Station ISDN number (MSISDN), Mobile Identification Number (MIN), Mobile Station Identifier (MSI), or a dynamically generated identifier such as Temporary Mobile Station Identifier (TMSI)).

However, some service platform switch services may permit multiple simultaneous call instances to be associated with a single subscriber's number. In such an arrangement, a pool of dedicated identities (e.g., billing identities) can be used. For example, a billing identity can be selected out of a pool of dummy (e.g., not identifying an actual subscriber) identities and used for a call. The selected identity can be temporarily associated with the actual identity for billing purposes. For call setup signaling, the selected identity can be substituted for the actual identity in hairpin loop call legs.

An example in which such an arrangement can be useful is in situations involving multi-line capability for the same directory number or call termination services. In the case of call termination services, multiple callers may be redirected to the service platform switch before being redirected away from the subscriber (e.g., routing terminating calls to a prepaid service system before delivery to a voicemail system). The use of dedicated billing identities can also aid in identifying call records associated with the hairpin loop for removal in downstream billing processing.

At 1314, calls arriving on the incoming hairpin loop trunk group trigger an event to locate the call instance for the corresponding outgoing hairpin loop trunk group matching the configured correlation parameter.

At 1316, upon finding a match of the correlation tags, hairpin loop processing can take place. In the example, the switch parks the original call leg that triggered the redirection to the service platform switch. Once parked, the switch can release the call leg to the service platform switch.

At 1318, the switch uses the called number (e.g., destination number) from the incoming call from the service platform switch call that was released. The switch treats the number as a redirection operation for the original call leg. If the calling party identity or billing identity were modified for call processing (e.g., to be one of a dedicated group of billing identities), the switch can restore the calling party identity.

If the calling party identity or billing identity were modified for call processing (e.g., to be one of a dedicated group of billing identities), the switch can restore the calling party identity (e.g., for signaling when the call is directed to its destination).

EXAMPLE 11

Implementing the Technology to Upgrade Equipment in Conventional Networks

One useful application of the described technologies is upgrading equipment in conventional networks. For example, hairpin avoidance processing (e.g., releasing call legs) can be done transparently to service platform switches. Accordingly, such service platform switches need not be upgraded. Further, the illustrated technologies can be used in systems not having special provisions for avoiding hairpin loops. As a result, conventional switches using ordinary call setup signaling and conventional interfaces can be easily upgraded without the added expense of incorporating supplementary services, new signal protocols, new interfaces, or new parameters.

Alternatives

The described technologies can be applied for use in any of a variety of landline or mobile telecommunications networks. For example, the technologies can be applied for use in GSM networks. In some cases, additional (e.g., intermediary) switches may be involved in the technologies. Although the examples have been discussed primarily in the context of telecommunications networks, the technologies are equally applicable to any circuit-switched networks. For example, in the case of any directed signal, a hairpin loop scenario can be detected and avoided (e.g., by removing legs).

In general, although the examples have been discussed primarily in the context of using calling party or billing identifiers to correlate call legs, many other identifiers used by a network to identify users or transactions can be used. Providing an exhaustive list is beyond the scope of this document, but some other examples of suitable identifiers include Electronic Serial Number (ESN), International Mobile Station Identifier (IMSI), and IAM-EL. Other identifiers include, for example, Directory Number (DN), Mobile Directory Number (MDN), Mobile Station ISDN number (MSISDN), Mobile Identification Number (MIN), Mobile Station Identifier (MSI), or a dynamically generated identifier such as Temporary Mobile Station Identifier (TMSI). Any other identifier, such as an Internet domain name or Internet address can also be used. In some cases, a combination of identifiers can be used for correlation (e.g., combination of calling party number and charge number).

Some of the examples describe using two groups of unidirectional trunks. In a unidirectional arrangement, traffic can pass in both directions, but certain trunks can be designated for call setup signaling from a particular (e.g., incoming) direction. In this way, the number of trunks being checked during correlation can be reduced. For example, when correlating for an incoming call leg, only identifiers for outgoing call legs need be checked. Alternatively, trunks need not be so designated. For example, a trunk might both initiate and receive calls.

Similarly, some of the examples describe input or output ports. However, an arrangement involving ports not so designated can be used in addition to or instead of having ports designated for input or output.

Further, in some of the examples, a particular type of call setup signaling (e.g., ISUP) is depicted. However, other types of call setup signaling (e.g., any signaling for initiating and establishing calls, such as that for ISDN-PRI, ISDN-BRI, R1 Feature Group-D, or GSM-based implementations) can be used instead.

Still further, in some of the examples, an identifier is correlated with another identifier passed via the same parameter. Alternatively, the correlation can be done via different parameters. For example, a called party parameter can be correlated with a charge number parameter. Also, more than one parameter can be combined for correlation. In some cases, correlation can be done even though the values of identifiers being correlated are not identical. For example, in a prepaid scenario, additional information may be prepended to an identifier.

In view of the many possible embodiments to which the principles of the invention may be applied, it should be recognized that the illustrated embodiments are examples of the invention, and should not be taken as a limitation on the scope of the invention. Rather, the scope of the invention includes what is covered by the following claims. I therefore claim as my invention all that comes within the scope and spirit of these claims.

I claim:

1. A method for processing a call in a telecommunications system comprising at least a first and second switch, the method comprising:
    storing correlation information for a first call leg related to a service request directed to the second switch by the first switch;
    detecting an attempt to establish a second call leg directed back to the first switch and forming a hairpin loop in conjunction with the first leg, wherein the detecting is based at least on the stored correlation information; and
    based at least on the detecting the attempt to establish the second call leg forming a hairpin loop in conjunction with the first leg, wherein the detecting is based at least on the stored correlation information for the first call leg related to the service request directed to the second switch by the first switch, releasing at least the first call leg.

2. The method of claim 1 wherein the detecting comprises comparing call setup signaling information associated with the first leg with call signaling information associated with the attempted second leg.

3. The method of claim 1 wherein the detecting comprises comparing calling party number signaling information associated with the first leg with calling party number signaling information associated with the attempted second leg.

4. The method of claim 1 wherein the detecting comprises comparing billing number signaling information associated with the first leg with billing number signaling information associated with the attempted second leg.

5. The method of claim 1 wherein
    the detecting takes place during attempted routing of the call to a destination; and
    the call is routed to the destination.

6. The method of claim 1 wherein the detecting comprises comparing billing number information associated with the first leg with a billing number parameter of an Initial Address Message associated with the attempted second leg.

7. The method of claim 2 wherein the call setup signaling information originates from an initial address message as part of ANSI-ISUP signaling.

8. The method of claim 7 wherein the call setup signaling information comprises a calling party identifier.

9. The method of claim 7 wherein the call setup signaling information comprises a charge number.

10. The method of claim 7 wherein the call setup signaling information comprises a charge number and a calling party number.

11. The method of claim 2 wherein the call setup signaling information originates from a setup message as part of ISDN-PRI signaling.

12. The method of claim 2 wherein the call setup signaling information originates from R1 Feature Group-D signaling comprising an Automatic Number Identification field.

13. The method of claim 2 wherein the call setup signaling information originates in a GSM network.

14. The method of claim 1 wherein the detecting comprises consulting trunk type associated with the attempted second leg.

15. The method of claim 1 wherein the detecting comprises comparing trunk membership associated with the attempted second leg against a list of trunks designated for comparison.

16. The method of claim 1 further comprising:
    selecting a temporary identity from a pool of identities; and
    substituting the temporary identity for an actual identity associated with the call.

17. The method of claim 1 wherein:
    the service request is a request for directory assistance; and
    a destination of the call is determined as a result of the directory assistance.

18. The method of claim 1 wherein:
    the service request is a request for accessing voicemail messages; and
    a destination of the call is determined as a result of accessing voicemail messages.

19. The method of claim 1 wherein:
    the service request is a request for voice-activated dialing; and
    a destination of the call is determined as a result of voice-activated dialing.

20. The method of claim 1 wherein:
    the service request is a request for prepaid services.

21. A computer-readable medium comprising computer-executable instructions for performing at least the following to process a directed signal in a system comprising at least a first and second switch:

storing correlation information for a first leg related to a service request directed to the second switch by the first switch;

detecting an attempt to establish a second leg directed back to the first switch and forming a hairpin loop in conjunction with the first leg, wherein the detecting is based at least on the stored correlation information; and based at least on the detecting the attempt to establish the second leg forming a hairpin loop in conjunction with the first leg, wherein the detecting is based at least on the stored correlation information for the first leg related to the service request directed to the second switch by the first switch, releasing at least the first leg.

22. A method for processing a call in a telecommunications network comprising at least a first and second switch, the method comprising:

for the call, establishing a first leg, the first leg resulting from a service request directed by the first switch to the second switch;

for the call, detecting a request to establish a second leg directed back to the first switch and forming a hairpin loop in conjunction with the first leg, the second leg being the call directed by the second switch to the first switch, wherein the detecting is based at least on call setup signaling information for the second leg; and based at least on detecting the request to establish the second leg forming a hairpin loop in conjunction with the first leg, releasing at least the first leg while maintaining connectivity for the call.

23. The method of claim 22 wherein the call setup signaling information for the second leg comprises an Automatic Number Identification parameter.

24. The method of claim 22 wherein the call setup signaling information for the second leg comprises a parameter from an Initial Address Message according to an ISUP signaling protocol.

25. The method of claim 22 wherein the call setup signaling information for the second leg comprises a Calling Party Number parameter from a Setup Message according to an ISDN-PRI signaling protocol.

26. A computer-readable medium comprising computer-executable instructions for performing at least the following to process a call in a telecommunications network comprising at least a first and second switch:

for the call, establishing a first leg, the first leg resulting from a service request directed by the first switch to the second switch;

for the call, detecting a request to establish a second leg directed back to the first switch and forming a hairpin loop in conjunction with the first leg, the second leg being the call directed by the second switch to the first switch, wherein the detecting is based at least on call setup signaling information for the second leg; and based on detecting the request to establish the second leg forming a hairpin loop in conjunction with the first leg, releasing at least the first leg while maintaining connectivity for the call.

27. A method for avoiding a hairpin loop scenario in a telecommunications system having at least a redirecting switch and a service platform switch, the method comprising:

receiving at the redirecting switch a call for which processing at the service platform switch is to be performed;

routing the call as an outgoing call leg from the redirecting switch the service platform switch over a trunk out of a trunk group designated as an outgoing hairpin loop trunk type, the routing comprising sending an Initial Address Message to the service platform switch, the Initial Address Message comprising an outgoing number;

receiving at the redirecting switch an incoming call leg on a trunk out of a trunk group designated as an incoming hairpin loop trunk type, the call comprising an Initial Address Message comprising an incoming identifier and a called party number;

correlating the outgoing call leg and the incoming call leg by determining that the outgoing number and the incoming identifier are identical;

responsive to correlating the outgoing call leg and the incoming call leg, releasing the incoming call leg; and routing the call to the called party number.

28. A method for dynamic correlation of call legs, the method comprising:

receiving a first incoming call leg from a call source;

providing a first outgoing call leg associated with the first incoming call leg to a service platform, wherein the first outgoing call leg comprises a correlation key;

receiving a second incoming call leg from the service platform, wherein the second incoming call leg comprises the correlation key;

providing a second outgoing call leg associated with the second incoming call leg to a destination;

employing the correlation key to correlate the first outgoing call leg with the second incoming call leg; and connecting the first incoming call leg to the second outgoing call leg.

29. A telecommunications switch software system for use in a telecommunications switch, the system comprising:

correlation information retriever logic operable to collect call set up signaling information from a call leg directed from the switch to another switch and store the information;

incoming call leg monitor logic operable to compare call set up signaling information from the call leg directed from the switch with call set up signaling information from a call leg directed to the switch; and hairpin loop avoider logic operable to remove at least the call leg directed from the switch to another switch upon detection of a match between call set up signaling information from the call leg directed from the switch and call set up signaling information directed to the switch.

30. The system of claim 29, wherein the signaling information from the call leg directed from the switch comprises an Automatic Number Identification.

31. The system of claim 29 further comprising:

a stored pool of identities dedicated for use by the switch software system; and identity substituter logic for replacing an actual identity with an identity selected from the pool of identities.

32. A system for tracking call legs between a first switch and a second switch, the system comprising:

means for storing call set up signaling information for a call leg directed from the first switch to the second switch as correlation information;

means for comparing the correlation information against call set up signaling information for a call leg directed from the second switch back to the first switch; and means operable to detect a match between the correlation information and the call set up signaling information for the call leg directed from the second switch back to the first switch and further operable for removing the call leg directed from the first switch to the second switch and the call leg directed from the second switch back to the first switch after detecting the match.

33. The system of claim 32 further comprising:

temporary identifier selection logic operable to select a temporary identifier;

substitution logic operable to substitute the temporary identifier for an identifier related with a call leg for use as the correlation information; and restoration logic operable to restore the identifier related with the call leg after the match is detected.

* * * * *

UNITED STATES PATENT AND TRADEMARK OFFICE
CERTIFICATE OF CORRECTION

PATENT NO. : 7,050,563 B2 Page 1 of 1
APPLICATION NO. : 10/085491
DATED : May 23, 2006
INVENTOR(S) : J. Mark Dammrose It is certified that error appears in the above-identified patent and that said Letters Patent is hereby corrected as shown below:

In the Specification:
    Column 1, line 40, "a. call leg" should read -- a call leg --
    Column 3, line10, "for art outgoing" should read -- for an outgoing --
    Column 7, line 34, "Directory Assistane, call" should read -- Directory Assistance call --
    Column 10, line 64, "IAM-EL" should read -- IAM-EI --

Signed and Sealed this

Twelfth Day of December, 2006

JON W. DUDAS
*Director of the United States Patent and Trademark Office*